Jan. 2, 1968   R. T. HAAG   3,360,930
ELECTRO-HYDRAULIC VALVE OPERATOR
Filed Oct. 23, 1965   3 Sheets-Sheet 1

INVENTOR.
ROBERT T. HAAG
BY Hamilton & Cook
ATTORNEYS

INVENTOR.
ROBERT T. HAAG
BY Hamilton & Cook
ATTORNEYS

United States Patent Office 3,360,930
Patented Jan. 2, 1968

3,360,930
ELECTRO-HYDRAULIC VALVE OPERATOR
Robert T. Haag, Mansfield, Ohio, assignor to Shafer Valve Company, Mansfield, Ohio, a corporation of Ohio
Filed Oct. 23, 1965, Ser. No. 503,392
8 Claims. (Cl. 60—52)

ABSTRACT OF THE DISCLOSURE

Apparatus for actuating fluid pressure operated motors, or the like. The apparatus provides for actuation by either a power driven pump assembly or a double ram hand pump assembly. A fluid reservoir and a manifold are formed integrally with the power driven pump assembly and abuttingly attached to the motor for power actuation thereof. A pressure responsive valve means in the manifold controls the flow from the power driven pump to the motor during operation of the power driven pump and also automatically isolates the power driven pump and fluid reservoir from the motor during manual actuation thereof by the hand pump assembly. Valving and conduit means are provided in the hand pump assembly selectively to control the direction of actuation of said motor upon actuation of the hand pump by a closed flow system whereby the pump requires no suction stroke. The valving and conduit means in the hand pump assembly also isolate the hand pump from the motor during actuation thereof by the power driven pump.

---

The present invention relates generally to apparatus for actuating fluid pressure operated motors or other similar devices. More particularly, the invention relates to apparatus for actuating hydraulic valve operators for pipe line valves. More specifically, the invention relates to apparatus for selectively actuating such hydraulic valve operators by manual or power driven pumps.

In recent years, telemetry, microwave, computer and other automatic controls have been employed in dispatching and controlling flows in pipe line systems or networks in gas line stations, oil fields, refineries, power plants, and other installations. Such systems require automatic valve operators to manipulate or control the various ball valves, plug valves, globe valves, gate valves, and other similar flow devices in the pipe lines, in response to the various automatic control systems.

Owing to the power, force or torque, and operation speed requirements for such valve operators, fluid pressure or hydraulic operated motor valve operators have been found to be best suited to these applications. For example, in prior United States Patents Nos. 2,708,907 and 2,778,338 a rotary vane hydraulic motor having uniform power and balanced torque characteristics is disclosed which may be used in such systems. Alternatively, a piston type linear movement valve operator, such as those disclosed in prior U.S. Patents Nos. 2,630,829, 3,004,551 and 3,004,552, may be employed.

Such valve operators require hydraulic pump and reservoir apparatus, valving, and control; and prior pipeline systems have included such hydraulic subsystems in the form of ancillary hydraulic piping and supply networks. However, the installation and operating costs of automatic pipe line systems is greatly increased if facilities for monitoring maintenance failures of the mechanical elements, such as hydraulic leaks and overloads, are required. Moreover, auxiliary, manually operable devices should be provided for actuating the valve operators in cases of power or control failure.

Almost all prior art systems of which applicant is aware require such monitoring or superintendence because of the presence of a multiplicity of external hydraulic piping connections and fittings. Furthermore, these concepts have usually contemplated utilization of inefficient and unreliable suction-type single piston and pumps as the auxiliary manual drives, requiring valving and access to the hydraulic fluid reservoirs operable independently of the power driven pump.

More recently, pipeline systems have been provided with certain unitary or combination manual and motor drive pump apparatus for hydraulic valve operators. Thus, many of the problems persisting in former systems have been alleviated or substantially eliminated due to the elimination of external piping connections and fittings and the incorporation of various safety and overload devices. However, the structural consolidation of the manual and power driven pumps into integral or unitary devices has required utilization of elaborately ported and valved common manifolds and multi-way selector valves, resulting in multiple and expensive fabrication and machining operations in the manufacture of the devices.

Moreover, the unitary devices still usually employ suction-type auxiliary hand pumps, necessitating selective access to a separate common hydraulic fluid reservoir for the consolidated or unitary device; and the inherent deficiencies of the suction pump have remained. For example, leakage in the valve operator or suction pump, due to defective or worn seals, valves, or part clearances, renders the suction pump inoperative. The pump is also inefficient or virtually inoprative under operating conditions of subnormal ambient temperatures or in other situations in which the viscosity of the hydraulic fluid is relatively high.

Furthermore, the interconnection, or common manifolding and communication, of the suction hand pump with the separate reservoir and power pump creates possibilities of loss or contamination of the system hydraulic fluid during manual operation.

Accordingly, it is an object of the present invention to provide simple, inexpensive apparatus for actuating valve operators in a pipeline system.

It is a further object of the invention to provide modular selectively and independently operable manual and motor drive apparatus in combination with a hydraulic valve operator, the combination apparatus requiring no external piping and having fail-safe features.

It is a still further object of the invention to provide an improved manual drive for hydraulic valve operator apparatus of the character described utilizing a positive drive hand pump, which does not depend upon suction operation, does not require a separate reservoir, and substantially eliminates or reduces the problems or deficiencies discussed above.

It is yet a further object of the invention to furnish improved and simplified manifold and valve constructions and hydraulic circuitry for modular drive apparatus as aforesaid.

It is yet another object of the invention to provide an improved manually operable pump for hydraulic valve operators, utilizing a positive drive double ram or piston device in combination with improved valve and manifold construction.

These and other objects of the present invention will become apparent upon reference to the description in the following specification of the preferred embodiment illustrated in the accompanying drawings, it being understood that the invention is to be measured solely by the scope of the appended claims.

One form of manual and motor drive pumping apparatus for selectively operating a hydraulic motor valve operator having pressure and exhaust connections is exemplified in the accompanying drawings as being adapted for operation of a rotary vane operator which, in turn, operates a rotary valve in a pipeline. However, it will be understood that apparatus according to my invention may be adapted to piston gate valve operators and other fluid motors and similar devices.

In general, the invention relates to a positive drive double ram hand pump and a motor driven pump with integral reservoir and manifold, each being of modular construction and preferably adapted for abutting interconnection in operative combination with a rotary vane valve operator.

Figure 1:
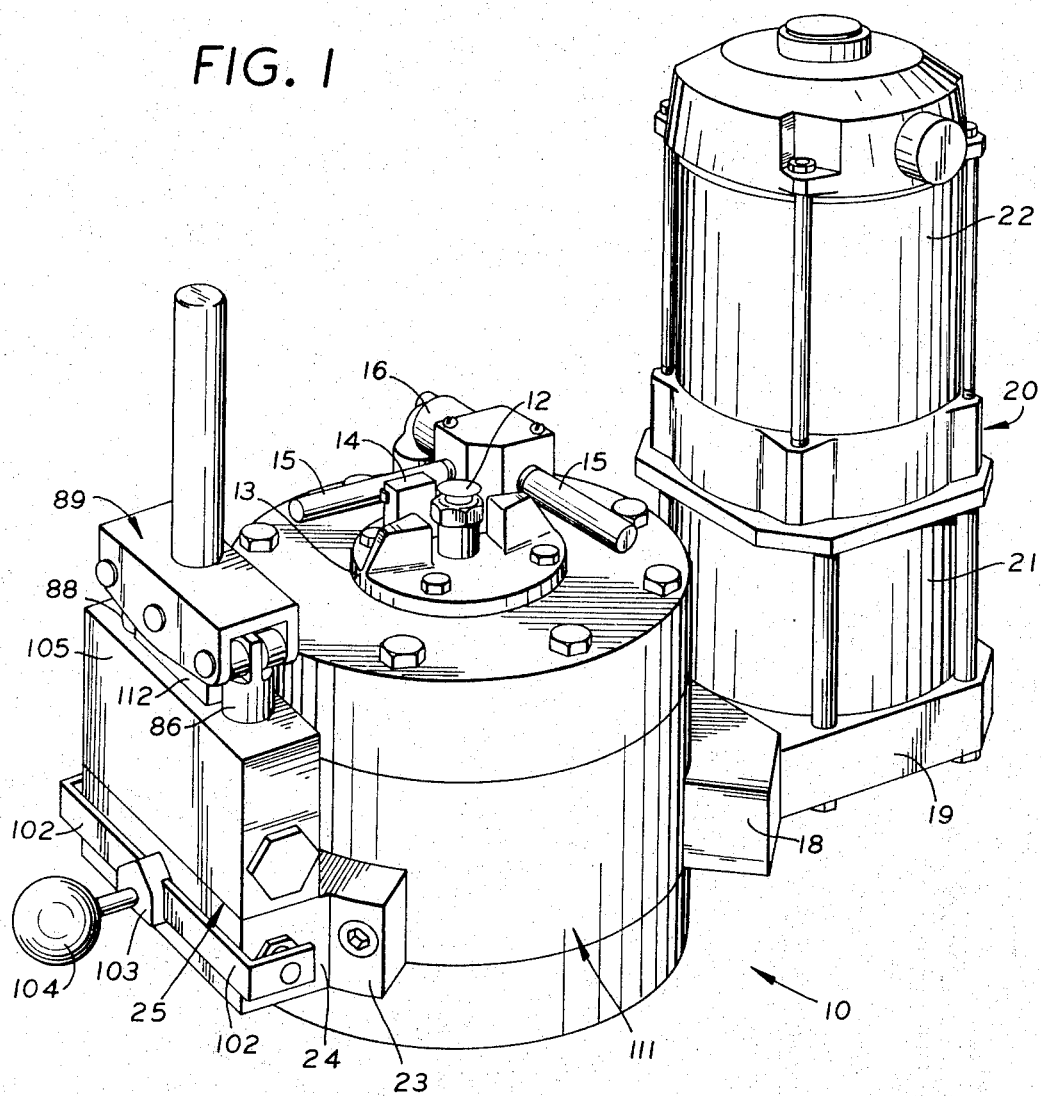
FIG. 1 is a side perspective view of modular rotary vane valve operator apparatus according to one preferred form of the present invention.

Referring generally to FIG. 1, the novel valve operator apparatus is designated generally by the numeral 10. A rotary vane hydraulic motor valve operator 11 is mechanically connected to and otherwise operatively mounted on a rotary pipeline valve (not shown) for selectively opening and closing thereof. The operator 11 may be of a construction as disclosed, for example, in the aforesaid U.S. Patents Nos. 2,708,907 and 2,778,338.

Operator 11 is preferably provided with an upwardly protruding stub shaft portion 12 of the internal vane rotor carrying a flange 13 thereon for rotation therewith. An electrical actuator device, such as permanent magnet 14, is carried on rotating flange 13 for sequential actuation of electrical sensors, such as magnetic proximity switches 15, to transmit electrical signals through wiring in conduit 16 to the pipeline electrical control system. These electrical signals indicate whether the rotary vane operator 11 and its associated pipeline valve is in the open or closed positon.

Abutted and mounted on one side portion of the operator 11 is a generally arcuate connector block 18 integrally joined to the manifold 19 of a unitary and modular motor driven punmp assembly, designated generally by the numeral 20. Manifold 19 encloses and operatively communicates with one end of a hydraulic fluid reservoir casing 21, the upper end of casing 21 being enclosed by a flange-mounting pump motor 22. Motor 22 may be powered by electricity, air, steam, internal combustion, or other suitable means so long as it is adapted for selective energization or actuation by the pipeline control system. However, standard A.C. or D.C. electric motors, which may have enclosures of an explosion-proof or weather-proof design, are preferred.

Preferably abutted and mounted to another side region of the valve operator 11 is a generally arcuate connector block 23 integrally joining with a manifold block 24 of a modular auxiliary manual pump assembly 25 hereinafter described.

Figure 2:
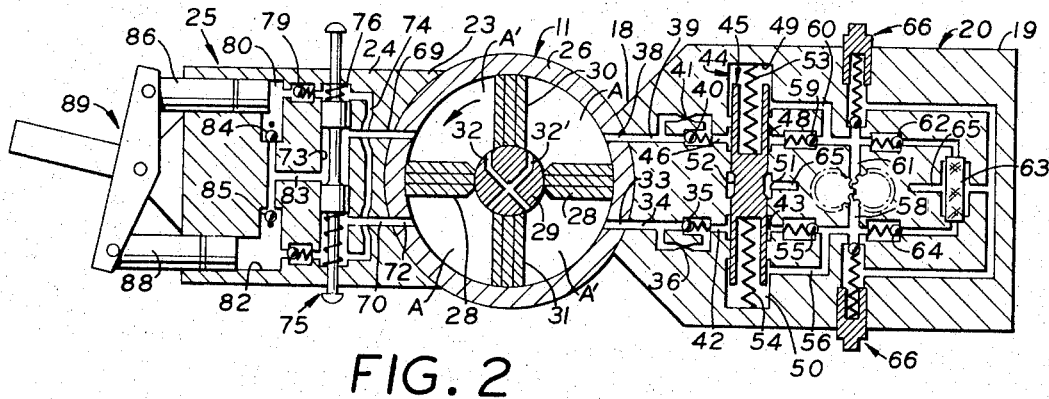
FIG. 2 is a functional schematic diagram of the apparatus of FIG. 1, the auxiliary manual drive being adapted to actuate the moving vanes of the rotary vane valve operator in a counterclockwise direction.
Figure 3:
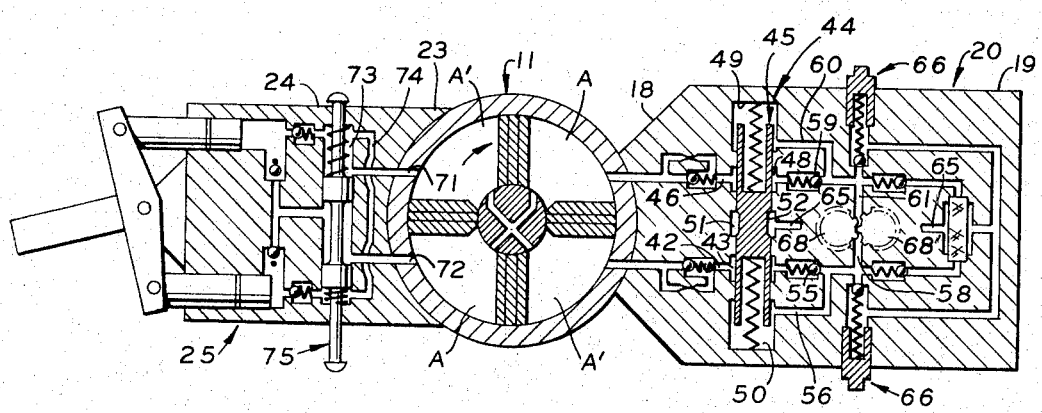
FIG. 3 is a similar functional schematic diagram, the apparatus being adapted for clockwise actuation of the rotary vane valve operator.
Figure 4:
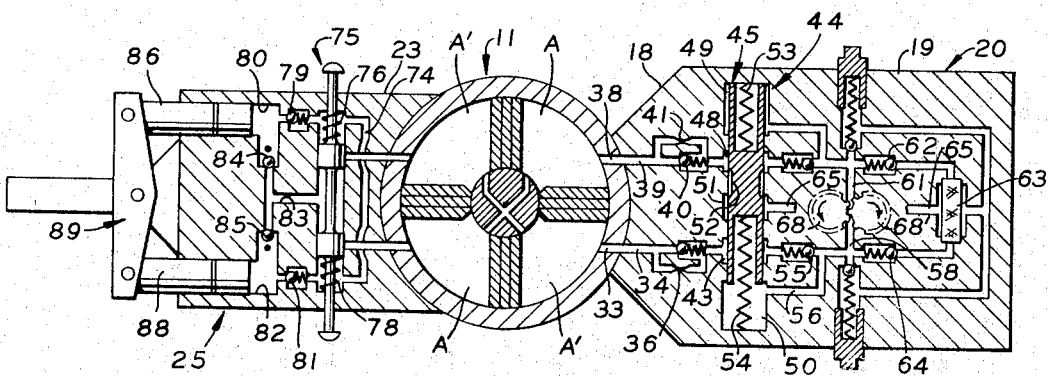
FIG. 4 is another functional schematic diagram, the manual drive being shown in a neutral position so that automatic operation may be initiated.

Referring generally to FIGS. 2, 3 and 4, the rotary vane valve operator 11 has a housing casing 26 with stationary diametrically oriented shoes 28 therein engaging in sealing relation with a rotor 29 having radially disposed vanes 30 and 31 thereon. The rotor is also preferably provided with crossover parts 32 and 32' for balancing the flow of hydraulic fluid between chambers of the motor operator 11 during rotary operation thereof.

When the operator 11 is mounted on and aligned with the pipeline valve in such a way that clockwise movement or rotary vanes 30 and 31 with rotor 29 effects closure of the pipeline valve, the leading surfaces of vanes 30 and 31, together with shoes 28, define exhaust chambers A. The rearward surfaces of the thus clockwise advancing rotary vanes 30 and 31 define pressure chambers A'.

Conversely, when the rotation of the operator 11 is reversed to counterclockwise, the condition of pressure or exhaust for the chambers thereby defined is reversed. Thus, ports or connections communicating with these chambers serve alternately as pressure and exhaust connections, depending upon whether the operator 11 is being actuated to closed or open position.

Communicating chambers A' of operator 11 are operatively hydraulically connected through connector port 33 to conduit 34 in arcuate connector block 18 of the motor drive pump assembly 20. Conduit 34 leads from connector block 18 into integral manifold 19 and connects to a check valve 35 and an orifice valve 36, in parallel therewith and preferably adjustable.

Communicating chambers A of operator 11 are similarly hydraulically connected through connector port 38 to conduit 39 in connector block 18 of motor drive assembly 20. Conduit 39 leads from connector block 18 into integral manifold 19 and connects to a paralleled arrangement of a check valve 40 and a preferably adjustable orifice valve 41.

A conduit 42 connects check valve 35 and orifice valve 36 to an annular chamber 43 in a bore 44 in manifold 19 carrying therein a generally cylindrical slide valve or automatic selector valve indicated by the numeral 45. Similarly, a conduit 46 connects check valve 40 and orifice valve 41 to an annular chamber 48 in bore 44.

Bore 44 is machined symmetrically with enlarged diameter cylindrical chambers 49 and 50 at each end and at annular recess or chamber 51 at the longitudinal mid point.

Cylindrical slide valve 45 has an annular recess 52 therein medially thereof and is biased to the middle of bore 44 by springs 53 and 54 at each end thereof.

As best seen in FIG. 4, cylindrical slide valve 45 and the annular recess 52 therein are dimensioned and proportioned so that, in the "up" position, recess 52 bridges and effects communication between annular chambers 48 and 51. Similarly, in the "down" position, recess 52 bridges and effects communication between annular chambers 43 and 51.

A check valve 55 is connected between annular chamber 43 and bypass conduit 56, one end of which leads to cylindrical chamber 50. The other end of bypass conduit 56 terminates in a pump discharge port 58. In like manner, a check valve 59 is connected between annular chamber 48 and bypass conduit 60, one end of which leads to cylindrical chamber 49. The other end of bypass conduit 60 terminates in a pump intake port 61.

Check valve 62 connects pump intake port 61 to a filter 63, and the filter 63 is also connected to pump discharge port 58 through check valve 64. Annular recess 51 in bore 44 is also connected to filter 63 by a conduit 65 which communicates with hydraulic fluid in the reservoir casing 21.

A pair of relief valves 66 are preferably mounted in the manifold 19 and connected to discharge port 58, suction port 61, and the filter system 63 so as to open up to atmosphere during high pressure overload conditions, as possibly caused, for example, by malfunction of the slide valve 45.

A pair of gear pump impellers 68 and 68' are disposed between the discharge port 58 and the intake port 61 and are operatively mechanically connected to the motor 22 above the manifold 19.

As shown by the arrows in FIG. 4, during power driven closure or clockwise actuation of the rotary vanes 30 and 31 of the valve operator 11, rotation of impeller gear 68 is counterclockwise while, rotation of impeller gear 68' is clockwise.

Impeller gears 68 and 68' discharge hydraulic fluid through discharge port 58 and, initially, into bypass conduit 56 to cylindrical chamber 50. Pressure in chamber 50 creates a piston force on cylindrical slide valve 45, raising it in bore 44 against the biasing force of spring 53. When slide valve 45 is fully raised (opening return flow in a manner to be described) check valve 55 yields and hydraulic fluid flows from pump discharge port 58 to annular chamber 43 in bore 44 and through orifice valve 36, which may be adjusted as desired to regulate flow and the resulting closure speed of the operator 11. Flow from orifice valve 36 is through conduit 34 to pressure port 33 to pressure chambers A' of valve operator 11.

Exhaust or return flow from operator 11, during such automatic or power driven closure actuation, is from exhaust chambers A to exhaust port 38 through conduit 39 and check valve 40 to annular chamber 48 in bore 44. Since the slide valve 45 is in the up position with annular recess 52 bridging annular chambers 48 and 51, fluid flows through recess 52 to chamber 51, from which it is fed through conduit 65 to the filter 63. From filter 63 the returning fluid flows through check valve 62 to the intake port 61 and back to the impeller gears 68 and 68'.

In view of the symmetrical porting and valving of the manifold 19, it will be apparent that the vanes 30 and 31 of valve operator 11 may be rotated counterclockwise to the valve open position by reversing the direction of rotation of the pump impeller gears 68 and 68', thereby reversing the direction of flow of pressure fluid.

As illustrated on the left hand sides of FIGS. 2, 3 and 4, the auxiliary manual pump assembly 25 is operatively hydraulically connected to the valve operator 11 through conduits 69 and 70 emerging from arcuate connector block 23 to mate with valve operator ports 71 and 72, respectively. Ports 72 and 72, in turn, communicate with pressure chambers A' and A, respectively.

A cylindrical casing 73 formed in the hand pump manifold block 24 is connected to conduits 69 and 70 generally inwardly from the ends of the casing. A crossover conduit 74 also hydraulically connects the ends of the casing 73.

Operatively disposed within casing 73 is a shuttle selector valve, indicated generally by the numeral 75. As shown in FIG. 4, the shuttle selector valve 75 is normally biased by springs 76 and 78 to the midpoint of the casing 73 so as to block fluid flow to and from conduits 69 and 70 and casing 73. Thus, during automatic operation of the valve operator 11 by the motor driven pump assembly 20, as illustrated in FIG. 4, the hand pump assembly is hydraulically isolated from the valve operator 11.

One end of casing 73 is hydraulically connected through a check valve 79 to a first generally cylindrical pump well 80. The other end of the casing 73 is likewise connected through a check valve 81 to a second generally cylindrical pump well 82. The medial region of the casing 73 is connected to a T-conduit 83, one leg of which is connected through a floating check valve 84 to the first pump well 80, the other leg being connected through a floating check valve 85 to the second pump well 82.

A first pump ram or piston 86 is operatively carried in the cylindrical well 80, and a second pump piston 88 is thus carried in the well 82. A yoke-handle actuator, indicated generally by the numeral 89, pivotally mechanically connects pistons 86 and 88 for alternating compression strokes in the wells 80 and 82 during manual actuation of the yoke-handle 89.

Referring to FIG. 2, the positive operation of the double ram hand pump during counterclockwise or valve opening rotation of valve operator vanes 30 and 31 will now be described, it being understood that the clockwise or valve closing rotation depicted in FIG. 3 is effected in an analogous manner by virtue of the symmetrical construction of the hand pump assembly 25.

Selector shuttle valve 75 is first positioned or shifted to the upper end of casing 73 so as to compress spring 76. During the compression stroke of piston 86 in well 80, hydraulic fluid pressure flow is from well 80, through check valve 79, through crossover conduit 74, through conduit 70, and through port 72 to pressure chambers A of the valve operator 11.

Exhaust or return fluid flow is from exhaust chambers A' through port 71, through conduit 69, through the medial region of casing 73 defined by the thus shifted shuttle valve 75, through T-conduit 83, and through floating check valve 85 to well 82. Thus, well 82 is surge filled with returning or exhausting fluid for the subsequent compression stroke therein of piston 88, and the hand pump 25 does not require a suction stroke or cycle, or a separate reservoir, with the attendant deficiencies and inefficiencies.

Figure 5:
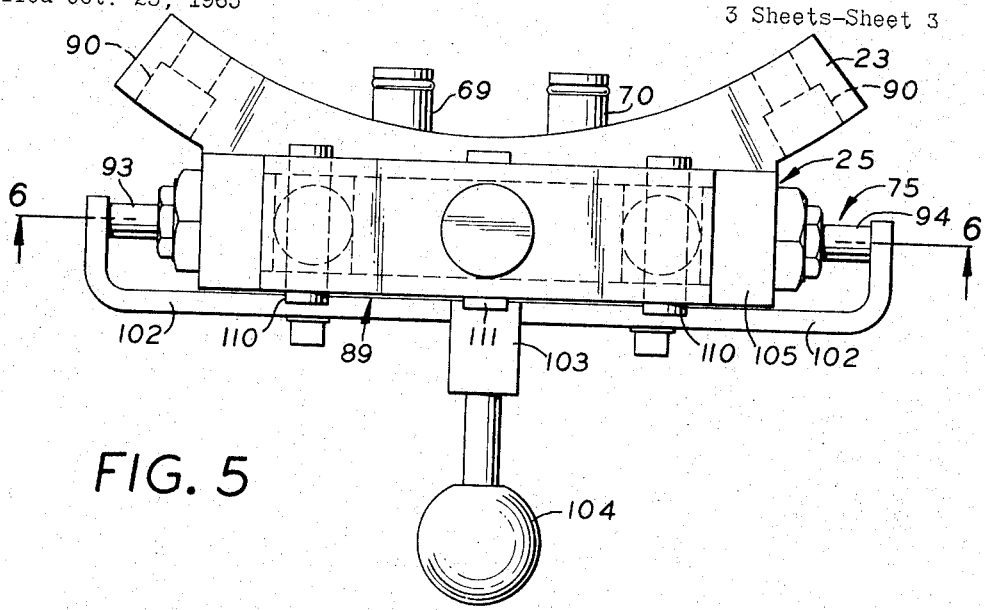
FIG. 5 is a top or plan view of the auxiliary manual drive module or subassembly at the left end of the apparatus illustrated in FIG. 1.
Figure 6:
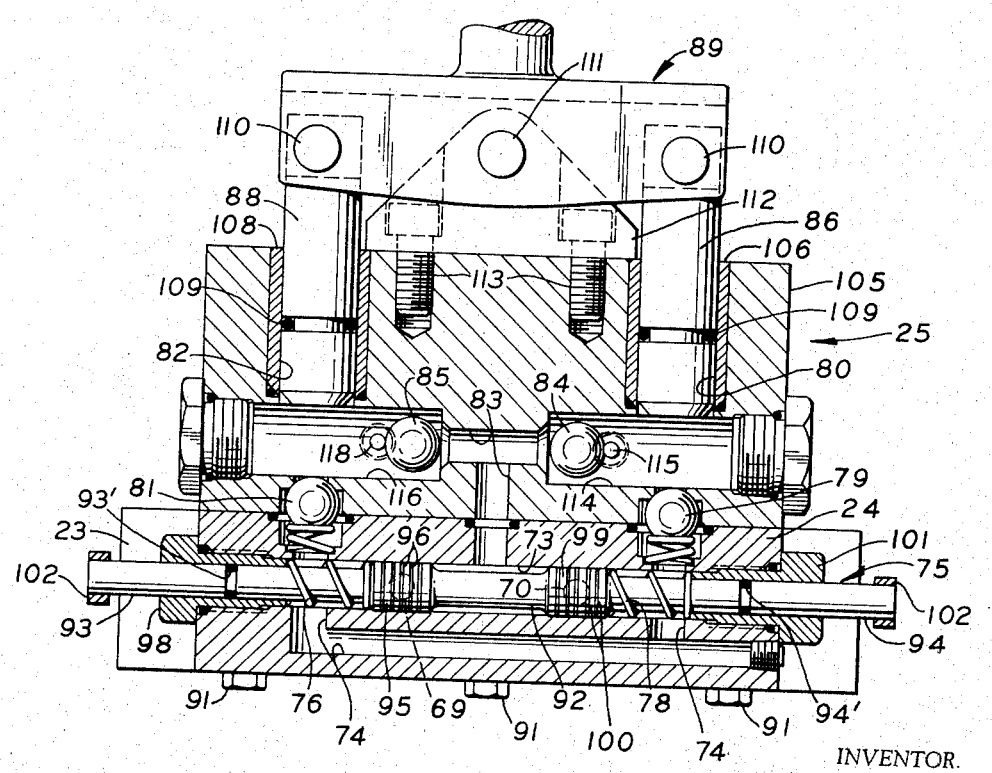
FIG. 6 is an elevational sectional view taken substantially along line 6—6 in FIG. 5.

Referring to FIGS. 5 and 6, the compact and simplified construction of the modular auxiliary hand pump assembly 25 will now be described.

As shown in FIG. 5, the connector block 23 is preferably arcuate in form for abutting mounting directly to the side of the housing of the valve operator 11 by cap screws through countersunk bores 90. Conduits 69 and 70 are formed with nipple connectors having seals thereon for telescoping connection in a pressure-tight fit with ports 71 and 72 of the valve operator 11.

Connector block 23 is preferably integrally formed with manifold block 24 which is bored and machined to provide the above-described conduits 69, 70 and 74 and cylindrical casing 73 for the shuttle selector valve 75. One part of the T-conduit 83, together with the spring seats for the check valves 79 and 81, are also formed in the manifold block 24 for sealing abutment fit and mechanical connection to the pump assembly 25 as by long screws 91.

As best seen in FIG. 6, the shuttle selector valve 75 riding in casing 73 is rod-like in shape and is formed with a medial portion 92 and outer stem portions 93 and 94 of lesser diameter than the casing 73 and having O-ring seals 93' and 94' thereon. Medial portion 92 is integrally joined to stem portion 93 by a shoulder portion 95 having a close diametral tolerance with respect to the casing 73 and carrying a plurality of oil relief grooves 96 effecting a sliding but pressure-tight fit between the shoulder portion 95 and the casing 73. Spring 76 abuts shoulder portion 95 and is coiled around the inner length of stem portion 93, the spring 76 being retained in operative position in the casing 73 by a stem guide sleeve 98 screwed into the bore in the manifold block 24 which forms casing 73.

The symmetrical shuttle selector valve 75 is also formed with a second sealing shoulder portion 99 joining medial portion 92 to stem portion 94, and having a plurality of oil relief grooves 100 thereon to effect a sliding but pressure-tight fit with casing 73. Spring 78 abuts shoulder portion 99 and is coiled around the inner length of stem portion 94, the spring 78 being retained in operative position in the casing 73 by a stem guide sleeve 101 in the bore in the manifold block 24 which forms casing 73.

As shown in FIGS. 1 and 5, the ends of stem portions 93 and 94 of the shuttle selector valve 75 extend in sliding but sealed relation through their respective stem guide sleeves 98 and 101 and are connected to an external bracket bar 102. Bracket bar 102 has a spring plunger 103 or other detent mechanism located medially of the bar 102 for selective lateral shifting thereof by manual actuation of handle-lever 104.

Referring again to FIG. 6, the hand pump assembly 25 includes a pump block 105 carried on the manifold block 24. Pump block 105 is bored and machined to form T-conduit 83 therein and seats for the balls for check valves 79 and 81.

Two bores are formed from the top of the pump block 105 to receive liner bushings 106 and 108, defining cylindrical pump wells 80 and 82, respectively. Pistons or rams 86 and 88 have wiper seals 109 thereon and are alternately axially translatable in liner bushings 106 and 108, respectively, to produce compression and surge exhaust return evacuation conditions in the wells 80 and 82 defined by the respective liner bushings.

The upper end of each of the pistons 86 and 88 is mechanically and pivotally connected to the yoke-handle 89 by roller pins 110 passing through slots in said pistons. The yoke-handle 89 is pivoted at its midpoint on a fulcrum pin 111 in a clevis-bracket 112 secured to the pump block 105 by screws 113.

At the bottom of pump well 80, it is operatively hydraulically connected to check valve 79 and one leg of T-conduit 83 by a transverse plugged bore 114. A floating ball check valve 84 is interposed between T-conduit 83 and bore 114 and is retained in operative seating relation near the juncture of conduit 83 with bore 114 by a flush plug and dowel pin 115.

Similarly, the bottom of pump well 82 is hydraulically connected to check valve 81 and the other leg of T-conduit 83 by a transverse plugged bore 116. In like manner, floating ball check valve 85 is interposed between T-conduit 83 and bore 116 and is retained in operative seating relation by a flush plug and dowel pin 118.

It should therefore be apparent that the above described preferred embodiment of modular manual and power driven apparatus for electrohydraulic valve operator systems accomplishes the several objects of the invention.

What is claimed is:

1. In a fluid operated motor apparatus, a modular double ram hand pump assembly connected to said motor for positive fluid surge actuation alternately from one ram to the motor and back to the other ram, and operatively connected valving and conduits in said hand pump assembly selectively to control the direction of actuation of said motor, a separate power driven pump assembly, fluid reservoir and manifold means integral with said power driven pump assembly, said manifold means being abuttingly connected to said motor for power actuation thereof, and pressure responsive valve means in said manifold means adapted to automatically isolate said power driven pump assembly and fluid reservoir from said motor during manual actuation thereof by said hand pump assembly.

2. Apparatus, according to claim 1, wherein said modular double ram hand pump assembly has a selector valve therein adapted to isolate said hand pump from said motor during power actuation thereof.

3. Apparatus, according to claim 1, wherein said pressure responsive valve means comprises a selector valve normally positioned to prevent fluid flow from said reservoir to said motor and operatively responsive to fluid pressure from said power driven pump assembly to open and permit fluid flow to said motor during power actuation thereof.

4. Apparatus, according to claim 2, wherein said power driven pump assembly includes reversible gear impellers operatively interconnected by conduits and valving with said selector valve for automatic reversing thereof to control the direction of movement of said fluid operated motor.

5. Apparatus, according to claim 2, wherein said fluid operated motor includes electrical sensors to deenergize said power driven pump at the terminus of motor travel in each direction.

6. In a fluid operated motor having pressure and exhaust ports, an integral power driven pump apparatus comprising; fluid reservoir means, power driven pump means abuttingly mounted on said reservoir means in operative communication therewith, manifold means enclosing one end of said reservoir means and having valving and conduits therein for operative abutting interconnection of said manifold to said ports of said fluid operated motor, and selector valve means in said manifold means for normally blocking fluid flow between said reservoir means and said fluid operated motor, said selector valve means being responsive to pressure from said pump means to permit fluid flow between said reservoir means and said fluid operated motor.

7. A modular auxiliary hand pump, for a rotary vane hydraulic valve operator having pressure and exhaust ports, comprising; a manifold block having an arcuate connector block portion integral therewith with connector conduit nipples therein adapted for abutting interconnection with said ports of said valve operator, a flow direction selecting shuttle valve in said manifold block operatively hydraulically connected to said connector conduit nipples, a pump block on said manifold block, a pair of piston wells in said pump block operatively hydraulically connected to said shuttle valve, a pair of pistons carried in said wells, and a yoke-handle actuator pivoted to said pistons and having a fulcrum on said pump block for alternating reciprocation of said pistons in said wells.

8. In combination with a fluid operated motor, an auxiliary hand pump, said motor having at least one vane movable in a casing, the casing forming a chamber on each side of said vane, said hand pump having a manifold, valve and conduit means in said manifold hydraulically connected to the chambers on each side of said vane, said hand pump having double, yoke actuated, ram pistons movable in individual piston wells, said wells hydraulically connected to said manifold, a compression stroke of the piston in either said well forcing fluid through valve and conduit means to the selected of said chambers for powering movement of said vane, movement of said vane forcing fluid from the opposite chamber through said valve and conduit means to surge fill the opposite said well.

References Cited

UNITED STATES PATENTS

| 99,403 | 2/1870 | Cardwell | 103—177 |
| 2,095,286 | 11/1937 | Riach | 60—52 |
| 2,693,824 | 11/1954 | Harrington et al. | 60—52 |
| 2,811,834 | 11/1957 | Shafer et al. | 60—52 |

EDGAR W. GEOGHEGAN, *Primary Examiner.*